Sept. 13, 1966 H. DA SILVA ET AL 3,273,063

CARRIER TRANSMISSION TELEGRAPH SYSTEM

Filed Aug. 23, 1962 4 Sheets-Sheet 1

INVENTORS
H. DA SILVA & H.C.A. VAN DUUREN

BY Hugh A. Kirk

ATTORNEY

Sept. 13, 1966 H. DA SILVA ET AL 3,273,063

CARRIER TRANSMISSION TELEGRAPH SYSTEM

Filed Aug. 23, 1962 4 Sheets-Sheet 2

| | SLAVE<br>to | MASTER<br>tg |
|---|---|---|
| RECEIVER — 0 | 2 I | 4 II |
| TRANSMITTER — Z | 16 IV | 8 III |

INVENTORS
H. DA SILVA & H. C. A. VAN DUUREN
BY
Hugh A. Kirk
ATTORNEY

FREQUENCY CYCLE CHART

| FREQUENCIES \ CYCLES= | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | |
|---|---|---|---|---|---|---|---|---|---|---|---|---|---|---|---|---|---|---|---|---|---|---|---|---|---|---|---|---|---|---|---|---|---|
| I | A | A | B | B | A | A | B | B | A | A | B | B | A | A | B | B | A | A | B | B | A | A | B | B | A | A | B | B | A | A | B | B | SLAVE RECEIVER |
| II | A | A | A | A | B | B | B | B | A | A | A | A | B | B | B | B | A | A | A | A | B | B | B | B | A | A | A | A | B | B | B | B | MASTER RECEIVER |
| III | A | A | A | A | A | A | A | A | B | B | B | B | B | B | B | B | A | A | A | A | A | A | A | A | B | B | B | B | B | B | B | B | MASTER TRANSMITTER |
| IV | A | A | A | A | A | A | A | A | A | A | A | A | A | A | A | A | B | B | B | B | B | B | B | B | B | B | B | B | B | B | B | B | SLAVE TRANSMITTER |

a' (cycles 1–2), c' (cycles 11–12), b' (cycles 21–22), d' (cycles 31–32)

FIG. 2 ← (cycle 19); FIG. 1 ← (cycle 20)

FREQUENCY OF I MUST EQUAL III AND FREQUENCY OF II MUST EQUAL IV FOR COMMUNICATION, AS IN CYCLES a', c', b' AND d' ONLY.

FIG. 5

INVENTORS
H. DA SILVA &
H.C.A. VAN DUUREN
BY
Hugh A. Kirk
ATTORNEY

Sept. 13, 1966 H. DA SILVA ET AL 3,273,063

CARRIER TRANSMISSION TELEGRAPH SYSTEM

Filed Aug. 23, 1962 4 Sheets-Sheet 4

INVENTOR.
H. DA SILVA & H.C.A. VAN DUUREN

BY

ATTORNEY 3,273,063

CARRIER TRANSMISSION TELEGRAPH SYSTEM

Herman da Silva, Voorburg, and Hendrik Cornelis Anthony van Duuren, Wassenaar, Netherlands, assignors to de Staat Nederlanden, ten Deze Vertegenwoordigd Door de Directeur-Generaal der Posterijen, Telegrafie en Telefonie, The Hague, Netherlands Filed Aug. 23, 1962, Ser. No. 218,894
Claims priority, application Netherlands, Aug. 30, 1961, 268,787/61
23 Claims. (Cl. 325—41)

The invention relates to a telegraph system with carrier transmission and automatic request for repetition. More particularly, it deals with a system for automatically changing the carrier frequencies between two stations whenever a predetermined number of successive errors or requests for repetition have been detected.

Earlier systems of this kind work with a carrier frequency which is usable in any period and which is only changed to an auxiliary frequency if the usefulness falls to a lower limit, e.g. of 80%.

This frequency change is attended mainly with the same preparatory measures as regards phasing and the like, as are necessary for establishing a new communication.

As these systems are predominantly worked by duplex operation, this difficulty is encountered in two directions, even in the so-called simplex system which is essentially a half duplex system.

Accordingly it is an object of this invention to change over the wave length or carrier frequency automatically in a simplex telegraph system each time such a change proves desirable.

Generally speaking the automatic frequency change-over system according to this invention work with chronological counting of groups transmitted and received. This group counting for such a simplex telegraph system is described in applicants' copending U.S. patent application Serial No. 94,337 filed Mar. 8, 1961 or now issued British Patent No. 930,128 published July 3, 1963.

When a communication is established according to this invention, two frequencies are assigned for both directions of traffic, and the relevant receiver chooses from these two frequencies a usable one to which its associated receiver distributor can phase itself. Since according to this simplex system there is only one frequency per communication in the air at any instant, a choice of only two frequencies will be all that will be necessary.

Thus this invention is based on the fact that in spite of the deterioration of the receiving conditions, at least one frequency in either direction is usable, and that the receiving conditions determine whether a frequency change is needed or not.

Also according to this invention each traffic period is preceded by an initial period in which the master station transmitter which at least in the start will be the information sending station, comes into a fixed relation to a receiver at a remote station, which remote station, during a stand-by period preceding the said initial period, is alternately timed switched to each of the two employed frequencies.

For example, this stand-by period begins some time before traffic can be expected and has a rhythm corresponding to the quickest frequency alternation during the traffic period at which at least two whole consecutive groups of signals or cycles can be determined to be correctly received, which means at least an additional signal group or cycle making at least three cycles in all.

During the initial period, the transmitter that starts transmitting first (at the master station), changes frequency periodically, when the communication is not established immediately. These periodic frequency changes or alternations at this transmitter are not related to the frequency changes performed by any remote receiver which frequency changes are much shorter.

The station beginning the transmission also initiates, during its initial period before transmitting its traffic information, the calling signal alternately on one of the two allotted frequencies; and these frequency changes are terminated when the calling signal has been answered.

More specifically this invention relates to a simplex telegraph system in which the transmission of information from one station acting as a master station can call another station acting as a slave station, only at predetermined regularly spaced intervals, and between these intervals awaits an answer back signal from the slave station regarding the reception of the information it last transmitted, before continuing the transmission of the next cycle or interval of information. During such alternate communications, a choice can be made between each interval of information signals, two defined carrier frequencies, one for the transmission of the information and the other for the answer-back signals. This frequency change, however, is only made after the reception in one of the stations, during a first predetermined number of cycles, of two successive mutilated signals or of two successive RQ signals, (RQ signals being signals serving as requests for repetition). Then the receiver switches to be sensitive to the other frequency. In such a case, after a second predetermined number of cycles following the moment of the said disturbance or RQ signal, the transmitter is switched over and so on, if necessary, until the return of undisturbed traffic occurs. Then the frequency pattern present is maintained until a fresh repetition period starts.

"Cycle" in this connection is to be understood to be an interval comprising one transmitting period and the pause following the transmission, and one transmitting period includes a block of at least three character signals and the subsequent pause is of equal time duration to that of said block. This cycle time unit is used during traffic, because at both ends the devices then work rhythmically.

On arrival of a calling signal (e.g. of a block) the receiver remains turned to the carrier frequency of this signal.

The periodicity of switching must at least be two cycles, because in the said simplex system with answer-back signals asking for a block of signals from the Master station (i.e. the station sending the message or information), can only be certain as to the meaning of any service signal after two successive receptions of it. Thus, if the same answer-back signal is received two times in succession at the Master station, this is a proof to the Master station of erroneous reception at the remote or slave station, which then can be interpreted as a request for repetition.

During the opening of traffic such a standard interval or cycle is missing and must be initiated by an artificially formed time constant of preferably the shortest possible duration, e.g. in the order of about a second of time, or for at least three cycles instead of two at the slave station receiver on stand-by operation.

During the completion of the initiation of the communication, the called station only starts transmitting after the correct reception of the calling signal. It usually starts on a certain frequency, which may prove usable, when the calling station answers with the group asked by the information receiver. If the called station only receives RQ-signals instead of an information group, it repeats its request for an information group by transmitting an answer-back signal on the same frequency as its first answer-back signal. In case the reception of RQ signals continues the transmission of the answer-back signal is switched over to the other frequency, after a predetermined number of cycles in a pattern.

The communication has been established, when a group of information signals has been received.

In the beginning of the establishment of the communication, the receiver of the called or slave station terminates the alternating switch-overs of its receiver and tunes it to the frequency on which the last unmutilated reception took place.

During proper reception or communication the transmission frequency is not changed as long as there arrives unmutilated signals, not containing two successive requests for repetition. Thus the receiver remains tuned to the frequency on which the unmutilated reception took place.

However on reception of mutilated signals or of unmutilated RQ signals twice in succession, the receiver is tuned to the other frequency; and the transmitter remains tuned to the frequency on which the unmutilated reception last took place for the time being.

The above mentioned and other features and objects of this invention and the manner of attaining them will become more apparent and the invention itself will be understood best by reference to the following description of an embodiment of the invention taken in conjunction with the accompanying drawings, wherein:

FIG. 5 is a chart of four possible different carrier frequency combinations of two frequencies between two stations and all the possible rhythmic intermediate changes of frequencies at each station in stepping from one combination to the other.

Before going into the figures it may be pointed out that in the beginning of a period in which the possibility of traffic must be opened, there begins a stand-by condition, in which only the receivers are switched-in and that subsequently, at a call for the transmission of information, a relation is formed between the master station and the slave station, in which the former will be the information-sending station. In the course of the communication these qualifications will continue to exist.

Figures 1, 2:
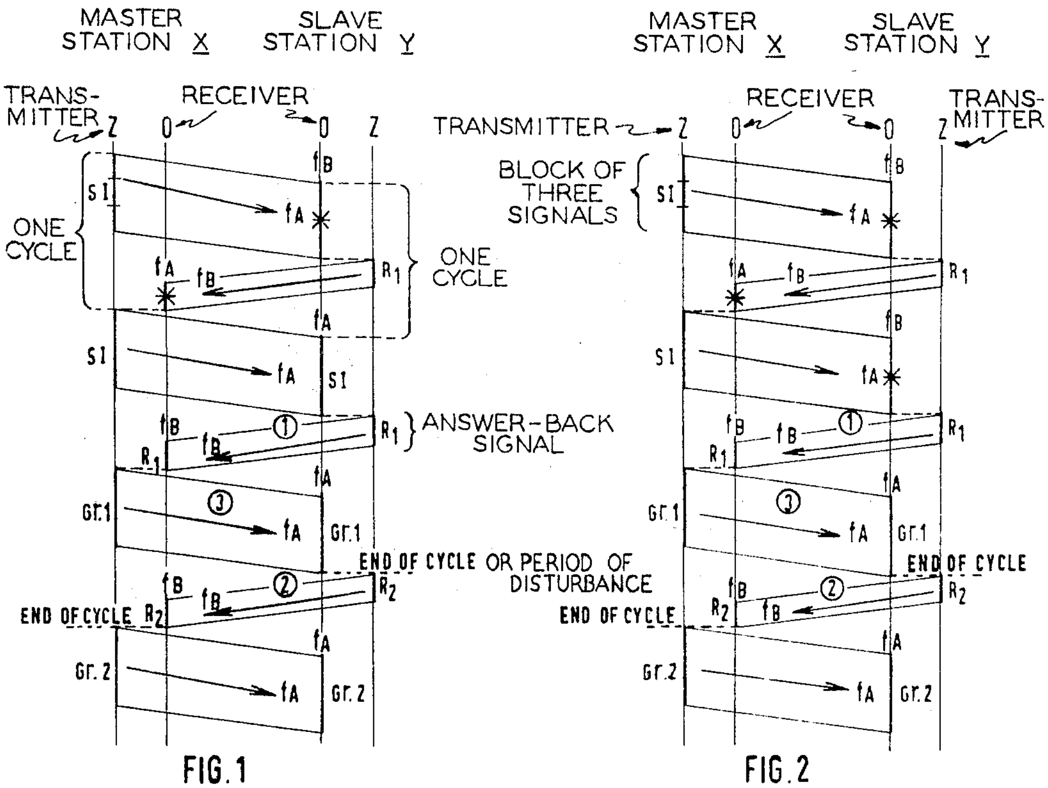
FIGS. 1 and 2 are time diagrams of periods of traffic, showing, in a communication between a master station and a slave station, how the rhythmic conditions are just before the proper change-over of frequencies after errors in two successive signals have occurred.

In FIGS. 1 and 2 there exists at the beginning of the diagrams a condition of repetition, due to some cause or other, and in any case this condition is continued due to the absence of correct reception.

FIGS. 1 and 2 each show the condition of interrupted traffic (at cycle No. 20 in the frequency chart in FIG. 5), in which the transmitter at station X works on a frequency $f_A$, which has become useless in receiver at station Y because the receiver at station Y is tuned to the frequency $f_B$. Thus no correct signal is exchanged. It is also supposed that the transmitter at station Y transmits on the frequency $f_B$ and the receiver at station X listens to the frequency $f_A$, so that no correct signals are received in the station X either.

In FIG. 1, at the second transmission, the station X transmits again on frequency A, but now station Y listens to this frequency too, because Y is the station receiving information, the receiver of which, due to the absence of correct reception, is after two cycles alternately tuned now to the other frequency $f_A$.

Station Y receives correct signals "SI" (RQ signals) now and its transmission of answer-back signals $R_1$ of frequency $f_B$ is also received correctly in station X, since the station X receiver has also been switched over to frequency $f_B$.

Now station X, on receipt of the answer back signal $R_1$, transmits information signals of group number 1 on frequency $f_A$, which are correctly received at station Y, since station Y did not change back to frequency $f_B$, due to good reception on frequency $f_A$.

At this moment, station Y is sure that the answer back signal $R_1$, which just had been transmitted was correctly received in station X, because station X sent the group number 1, when station Y asked for it. So the transmission from station Y, is the answer-back signal $R_2$ (or a request for information signal group number 2) which takes place on the same frequency $f_B$ as the previous answer-back signal had been sent on.

On receipt of answer-back signal $R_2$, station X is also sure that the reception in station Y was good, so that further changing of frequency is stopped at station X also.

So in the said second ransmission the station Y receives signal I, "SI" in FIG. 1, after which station Y transmits answer-back signal $R_1$ on frequency $f_B$. This time station X yistens to frequency $f_B$ too, so that this answer back signal is correctly received and station X then transmits the traffic group number 1 on frequency $f_A$, on which station Y also listens, and thus properly receives this group number 1. For station Y this is the end of the repetition cycle, because it appears from the reception of group number 1 that station X has good reception too. The fact is that after one correct reception the situation at the master station is known at the slave sation, but the master station needs two successive good receptions or answer-back signals ($R_1$ and $R_2$ in FIG. 1) to know the correct situation at the slave or remote station.

Then station Y transmits answer-back signal $R_2$ on frequency $f_B$ and since station X is still listening on frequency $f_B$ on which it receives answer-back signal $R_2$, station X may not conclude that the repetition period has finished. Now these frequencies remain in use in the manner in which the mutual correct reception has been ascertained.

In FIG. 2 (at cycle No. 19 in chart in FIG. 5) although the second special signal "SI" is not correctly received, the second answer back signal $R_1$ transmitted on frequency $f_B$ is correctly received.

Station X then transmits information signal group number 1 on frequency $f_A$, on which frequency the station Y is listening, and accordingly station Y properly receives this group number 1. For station Y, this is again the end of the repetition period or cycle.

So during traffic the following considerations are of importance:

If the usable frequency of the direction X to Y is the frequency $f_A$ and that of the direction Y to X the frequency $f_B$, (at No. 21 and No. 22 in the chart in FIG. 5) the frequency pattern obtained for traffic from station X transmitter Z to station Y receiver O, and the answer-back from station Y transmitter Z to station X receiver O, etc., by switching must be:

| STATION X | | STATION Y | | |
|---|---|---|---|---|
| Transmitter Z | Receiver O | Receiver O | Transmitter Z | |
| A ——→ | | A | | At cycles b′ in Fig. 5. |
| | B | ←—— | B | |
| A ——→ | | A, etc. | | |
| Depending on the usable frequencies per circuit, the other possible combination patterns are: | | | | |
| A ——→ | | A | | At cycles a′ in Fig. 5. |
| | A | ←—— | A | |
| A ——→ | | A, etc. | | |
| B ——→ | | B | | At cycles c′ in Fig. 5. |
| | A | ←—— | A | |
| B ——→ | | B, etc. | | |
| B ——→ | | B | | At cycles d′ in Fig. 5. |
| | B | ←—— | B | |
| B ——→ | | B, etc. | | |

which may also be required to get to the end of a repetition period. As the changing-over program is different for either station and for either transmitter or receiver, it must be established which program is allotted to which station.

The above-mentioned examples show for which reasons the rhythm of the frequency change in the master station and in the slave station has been chosen in accordance with a binary code as is shown in FIG. 5.

Figures 3, 4:
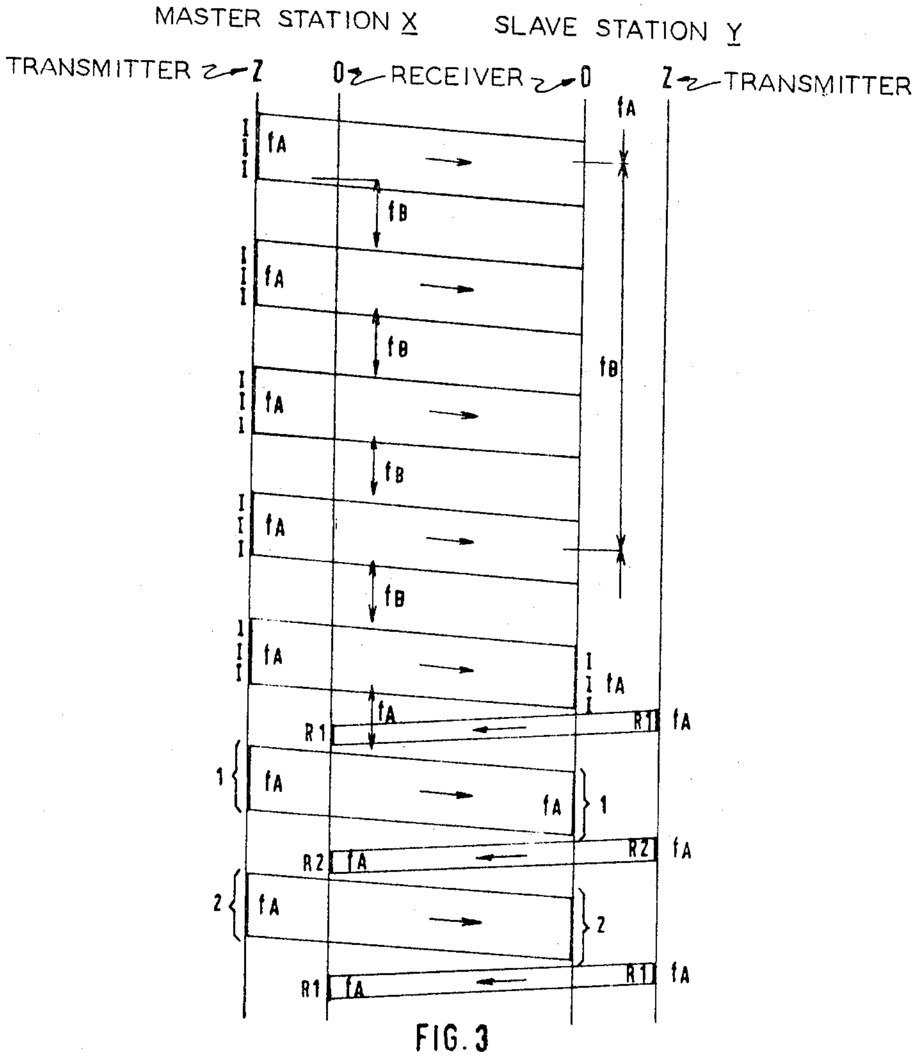
FIG. 3 shows another time diagram of the stand-by condition of a slave station before the handling of traffic.
FIG. 4 is a chart of the frequency periodicities of a receiver and a transmitter for a master and a slave station.

Thus the highest periodicity of frequency change is allotted to the receiver of the slave station, because in the stand-by condition the two receivers are listening and a transmitter having information to transmit makes a call, thus establishing its own station as master station. The receiver of a remote station must adjust itself as soon as possible to the frequency on which the call is transmitted and for this reason it must change listening to the one frequency and to the other in the quickest way possible. In the table in FIG. 5 it has been supposed that for some reason or other the adjustment has not taken place in the first 32 rotations. FIG. 4 shows the relationship of the frequencies and the receiver and transmitter at a master and a slave station.

FIG. 3 shows this situation during a call. In it is indicated that during this stand-by period this receiver of the slave station remains tuned to a frequency one cycle longer (i.e. for 3 cycles) than in a change-over (i.e. for 2 cycles) during traffic. This has been done to make the mutual phasing of the stations possible.

If the four frequency changing programs are called I, II, III, IV, as shown in FIG. 5, the programs II and III can be allotted, respectively, to the receiver and the transmitter of the master station, and the programs I and IV, respectively, to the receiver and the transmitter of the slave station.

As for the station transmitting information according to FIGS. 1 and 2, the usable receiving frequency must be utilized twice, the changing programs I, II, III and IV must be so chosen that the configurations *a′*, *b′*, *c′*, and *d′* can arise, and notably with a highest possible repetition frequency.

If the programs—

I: one change every 2 cycles;
II: one change ever 4 cycles;
III: one change every 8 cycles;
IV: one change every 16 cycles are used, a repetition of each pattern always occurs after 32 cycles (see FIG. 5).

As regards this, it is observed that the change (respectively the difference between the changing periods) need not be binary, but it is thought that with the binary change the shortest possible repetition periodicity is obtained.

In another embodiment use may be made of a special or additional answer-back signals indicating what frequency to use. Thus a station receiving mutilated signals may inform a remote transmitting station by transmitting such a special answer-back signal, which of two defined frequencies the first-mentioned station is going to receive. This first-mentioned station however will continue the answer-back signal transmission on the frequency already in use unless it appears from the remote transmitting station by special signals that the other answer-back carrier frequency is asked for.

In still another embodiment, which requires much more apparatus, both stations continue to listen on both of the defined frequencies, and each time each station tries to pick out the signal that proves to be unmutilated; and when there is received signals conveying a request for repetition, then further transmission takes place on the other frequency.

Figure 6:
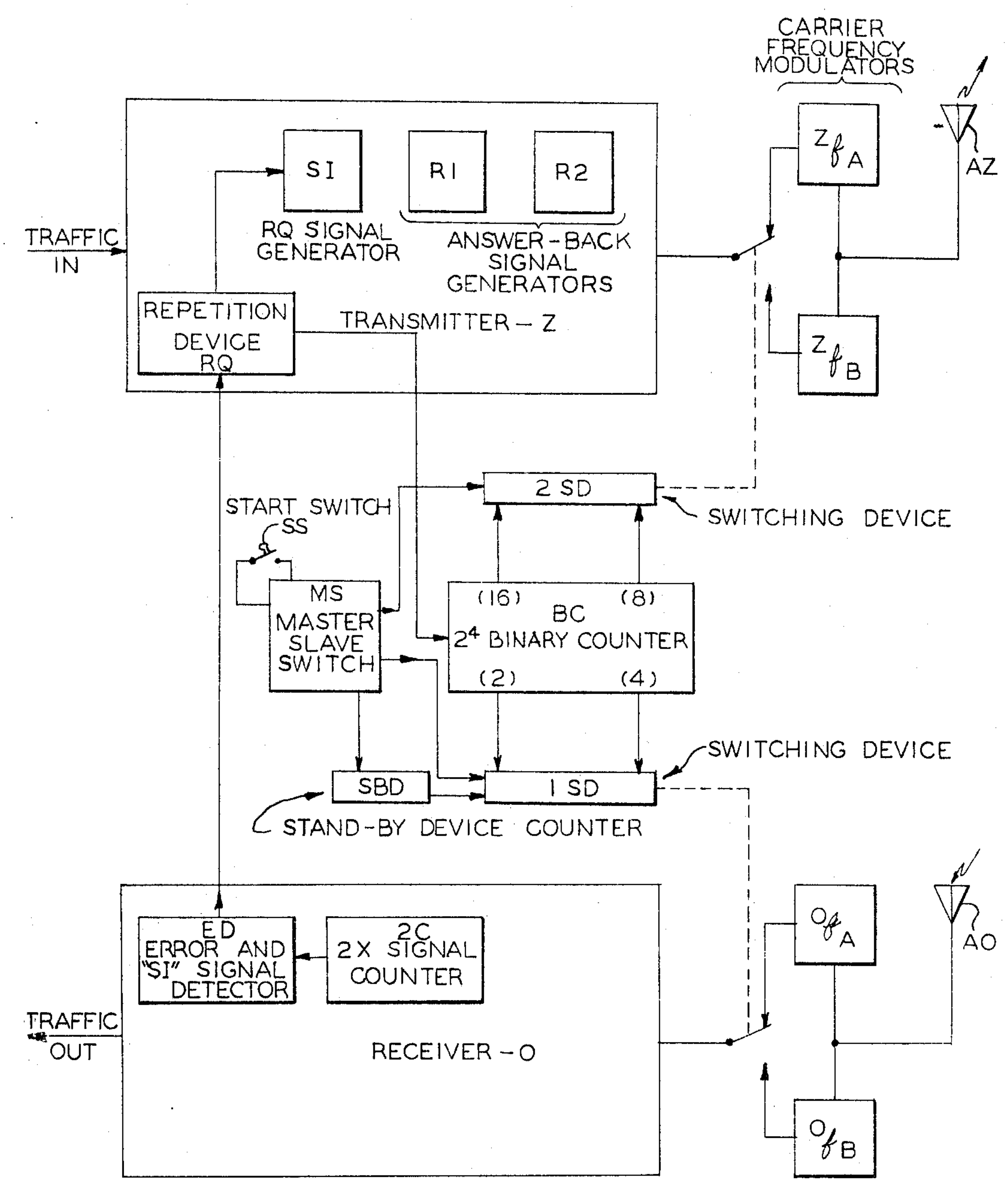
FIG. 6 is a schematic block wiring diagram of the system of one embodiment of this invention for a transmitter and receiver at any one station.

Referring now to FIG. 6 there is disclosed a block diagram of the functions and apparatus mentioned above for a circuit at any one station. This diagram comprises blocks for the circuits of a standard type radio telegraph transmitter Z and the receiver O. The transmitter circuit includes a repetition device RQ, and RQ signal generator or generator for special signal "SI" for requesting a repetition, and two answer-back signal generators for the first and second answer-back signals "R1" and "R2" which correspondingly request group 1 and group 2 of the traffic signals, if the previous preceding groups 2 and 1, respectively, have been correctly received at the remote or slave station. The receiver circuit O includes the error and special signal "SI" detector circuit ED as well as a two-signal counter circuit 2C to determine when two errors or two special signals requesting repetition, namely signals "SI," have been received in succession.

The remainder of the circuits disclosed in the transmitter Z and receiver O may be the same as those for a simplex type telegraph system, particularly that disclosed in applicants' copending application Serial No. 94,337 filed Nov. 8, 1961 or now described in issued British Patent No. 930,128. Thus for normal operation in the event no errors have been received nor requests for repetition, the transmitter Z and receiver O continue operation on their regular carrier frequencies, and the prior automatic error correction and repetition device operates in the normal manner when one isolated error occurs in any signal or the group of signals, or one isolated request for repetition is received for any group of signals. However, when such errors or requests occur at least twice in succession, this usually means that there is probably interference with the carrier frequency of another transmitting station in the same general region and then the automatic change-over of frequencies according to this invention takes place, via the signal counter 2C and error detector ED and repetition device RG to initiate the binary counter BC.

This binary counter BC counts cycles of signals being communicated according to $2^4=32$ cycles to produce four different frequency changing programs I, II, III, IV for the two different carrier frequencies A and B as shown in FIG. 5, namely changing the frequency cycles after each 2, 4, 8 and 16 cycles of signals from frequency A to frequency B for the slave receiver, master receiver, master transmitter and slave transmitter, respectively. As shown herein the separate outputs "2" and "4" from the binary counter BC go to a first switching device 1SD for controlling the frequency of the switching of the receiver carrier frequency back and forth from A to B at least twice as rapidly as those of the changes of the transmitter carrier frequency between A and B. Thus the switching device 1SD controls the switch between the receiver carrier frequency modulators O*f*A and O*f*B connected to the receiving antenna AO. The binary counter BC outputs "8" and "16" control the second switching device 2SD which in turn controls the carrier frequency modulators Z*f*A and Z*f*B for the transmitted signals from the transmitter Z out through the transmitting antenna AZ.

The first and second switching devices 1SD and 2SD are also controlled by the master-slave switching circuit MS, which when the start switch SS connected thereto is in its open condition, automatically controls the station as a slave station, but when the switch SS is closed indicating that this station wishes to transmit traffic, the circuit MS automatically operates this station as a Maser station and sends out calling signals to the slave station or stations to which it wishes to communicate. Assuming the station to be contacted is in its slave controlled condition, the circuit MS also controls the standby device counter SBD which in turn controls the first switching device 1S2 to maintain it in at least a three instead of a two cycle change-over operation so that two successive answer-back signals can be received by the master station and the master or calling station will know that the called or slave station has received the calling signal correctly and traffic signals may be transmitted to it. As soon as this occurs the switch MS is controlled by the receiver O to disconnect the standby counting device SBD, and then any further changes in frequency are solely under the control of the binary counter BC in the event a double error or double request for repetition is detected.

While we have illustrated and described what we regard to be the preferred embodiment of our invention, nevertheless it will be understood that such is merely exemplary and that numerous modifications and rearrangements may be made therein, without departing from the essence of the invention, we claim:

1. In a telecommunication system in which traffic is sent in separate groups of signals from a master station to a remote slave station, and said slave station sends answer-back signals in the spaces between each group of traffic signals to indicate the next group to be sent depending upon the correct reception of the preceding group by the slave station, said group and space thereafter comprising one signal cycle, the improvement comprising:

(A) transmitting said signals on one of at least two predetermined carrier frequencies, (B) changing the carrier frequency from one of said signals at its receiving station when one of the two following conditions have been detected:

(1) two successive erroneous signals, (2) two successive requests for repetition, and (C) changing the carrier frequency for transmitting said one signal at its transmitting station to said one changed carrier frequency a predetermined number of signal cycles after said one carrier frequency change in said receiving station.

2. A system according to claim 1 wherein the periodicity of changing over the carrier frequency at said receiving station occurs every two signal cycles until proper communication has been re-established.

3. A system according to claim 1 including the stopping of the changing over of said carrier frequencies as soon as communication has been established between said master and said slave station for both said traffic and said answer-back signals.

4. A system according to claim 1 including increasing the periodicity of changing over the carrier frequency at a stand-by called slave station by at least one additional signal cycle to that normally employed for the periodicity of changing the frequency at any receiver, in order to insure knowledge by the master calling station of proper reception of the calling signals by said slave station.

5. A system according to claim 4 including terminating the operation of additional stand-by counting cycles at the receiving station as soon as the call between said master and said slave stations has been completed.

6. A system according to claim 1 wherein the carrier frequency of the go and return paths between said master and said slave stations are different.

7. A system according to claim 1 wherein the carrier frequencies of the go and return paths between said master and said slave stations are the same.

8. A system according to claim 1 including transmitting a special answer-back signal for indicating on what frequency the next transmission should be made.

9. A system according to claim 1 including listening to both frequencies at each station and selecting the best received signal from both frequencies.

10. A system according to claim 1 including selecting the other of two frequencies when a request for repetition has been received on one carrier frequency.

11. In a telecommunication system in which traffic is sent in separated signals from one station to another and said other station sends answer-back signals in the spaces between successive traffic signals to indicate the next traffic signal to be sent depending upon the correct reception of the preceding traffic signal and the answer-back signal, each traffic signal and space following it comprising one signal cycle, the improvement comprising:

(A) transmitting said signals on one of two predetermined frequencies, (B) changing the carrier frequency from one of said signals at its receiving station after two successive signals have been detected to be erroneous, (C) changing the carrier frequency for said one signal at its transmitting station to said one changed carrier frequency a predetermined number of signal cycles after said one carrier frequency changes, and (D) stopping the changing of said carrier frequencies when correct communication has been established between said stations both for said traffic signals and said answer-back signals.

12. A system according to claim 11 wherein said communication system is a simplex telegraph system.

13. A method for automatically changing the carrier frequency of telegraph signals between two radio telecommunication stations comprising:

(A) transmitting spaced groups of traffic signals from a master station to a slave station over one of two carrier frequencies, (B) receiving said traffic signals from said master station at a slave station over said one carrier frequency, (C) transmitting during the spaces between said groups of traffic signals answer-back signals from said slave station to said master station over one of said two carrier frequencies for indicating the condition of the reception of the group of traffic signals just received by said slave station, (D) receiving said answer-back signals from said slave station at said master station for controlling which group of traffic signals is to be next transmitted, (E) detecting the presence of errors and requests for repetition in two successive signals transmitted from one station to the other station, (F) changing the carrier frequency of the receiver of said two successively detected signals to its other carrier frequency after a given predetermined number of signal cycles, (G) changing the carrier frequency of the transmitter of said two successive detected signals to the other carrier frequency according to a lower predetermined number of signal cycles, and (H) stopping said changings of said carrier frequencies when correct communication between said stations is again established.

14. A method according to claim 13 including overriding the frequency changing rate at said receiver of a stand-by slave station by at least one additional signal cycle to insure that said master station calling said slave station can know that said slave station has correctly received its calling signals.

15. In a telecommunication system in which traffic is sent in separated signals from one station to another, and said other station sends answer-back signals in the spaces between successive traffic signals to indicate the next traffic signal to be sent depending upon the correct reception of the preceding traffic signal and the answer-back signal, each traffic signal and space following it comprising one signal cycle, each station comprising:

(A) a transmitter for said signals, (B) means in each transmitter for repeating the signals incorrectly received by a remote station, (C) a receiver for said signals, (D) means in each receiver to detect errors in said signals received and request their repetition, the improvement comprising:

(E) means for providing at least two carrier frequencies for said signal between said stations, (F) a first switching means for changing the carrier frequency of said receiver at one station after a signal has been detected twice in succession to be one of the following:

(1) a request for repetition, (2) an erroneously received signal, and (G) a second switching means for changing the carrier frequency of the transistor at the other station a predetermined number of signal cycles after the change in frequency by said first switching means, and (H) means for stopping the operation of said first and second switching means when proper communication has been established between both said stations.

16. A system according to claim 13 wherein the frequencies on the go and return paths are not the same.

17. A system according to claim 13 wherein the frequencies on the go and return paths are the same.

18. A telegraph system according to claim 13 wherein the traffic signals are transmitted in groups and each space between adjacent groups is equal in time duration to that of one of said groups.

19. A system according to claim 15 wherein said switching means include a binary counter for controlling both said switching means, and wherein said binary counter is controlled by said means for repeating said signals in said transmitter.

20. A system according to claim 19 wherein said first switching means is controlled by each two and four signal cycles, and said second switching means is controlled by each eight and sixteen signal cycles of said binary counter.

21. In a telecommunication system in which traffic is sent in separated groups of signals from a master station to a remote slave station, and said slave station sends answer-back signals in the spaces between each group of traffic signals to indicate the next group to be sent depending upon the correct reception of the preceding group by the slave station, said group and space thereafter comprising one signal cycle, the improvement comprising:

(A) transmitting said signals on one of at least two predetermined carrier frequencies, (B) changing the carrier frequency at its receiving station when one of the three following conditions have been detected:

(1) a defined number of successive erroneous signals, (2) the same defined number of successive requests for repetition, (3) the same defined number of a combination of successive erroneous signals and requests for repetition, and (C) changing the carrier frequency at its transmitting station when one of the three following conditions have been detected:

(1) another defined number of successive erroneous signals, (2) the same other defined number of successive requests for repetition, (3) the same other defined number of a combination of successive erroneous signals and requests for repetition.

22. A system according to claim 21 wherein said defined number at the receiver is two in the salve station and four in the master station.

23. A system according to claim 21 wherein said other defined number at the transmitter is sixteen in the slave station and eight in the master station.

No references cited.

DAVID G. REDINBAUGH, *Primary Examiner.*

MALCOLM A. MORRISON, *Examiner.*

S. SIMON, S. J. GLASSMAN, *Assistant Examiners.*